US007475391B2

(12) United States Patent
Bustelo et al.

(10) Patent No.: US 7,475,391 B2
(45) Date of Patent: Jan. 6, 2009

(54) SYSTEM AND METHOD FOR REVEALING REMOTE OBJECT STATUS IN AN INTEGRATED DEVELOPMENT ENVIRONMENT

(75) Inventors: Leugim A. Bustelo, Austin, TX (US); Andrew Douglas Hately, Austin, TX (US); Julio Eloy Ruano, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 10/960,584

(22) Filed: Oct. 7, 2004

(65) Prior Publication Data

US 2006/0080639 A1 Apr. 13, 2006

(51) Int. Cl.
*G06F 9/45* (2006.01)
(52) U.S. Cl. .................................................... 717/138
(58) Field of Classification Search .............. 717/1–113, 717/138, 124–134; 709/223, 224
See application file for complete search history.

(56) References Cited

U.S. PATENT DOCUMENTS

| 6,189,138 B1 * | 2/2001 | Fowlow et al. .............. 717/107 |
| 6,263,485 B1 | 7/2001 | Schofield |
| 6,314,559 B1 | 11/2001 | Sollich |
| 6,502,233 B1 | 12/2002 | Vaidyanathan et al. |
| 6,519,767 B1 | 2/2003 | Carter et al. |
| 6,532,471 B1 | 3/2003 | Ku et al. |
| 6,748,582 B1 | 6/2004 | Chiles et al. |
| 2002/0186250 A1 | 12/2002 | Gardas et al. |
| 2004/0006760 A1 | 1/2004 | Gove et al. |
| 2004/0015898 A1 | 1/2004 | Tewksbary |
| 2004/0068586 A1 | 4/2004 | Xie et al. |
| 2004/0078788 A1 | 4/2004 | Wong |
| 2004/0243974 A1 * | 12/2004 | Gardas et al. ............... 717/106 |
| 2005/0138638 A1 * | 6/2005 | Pilkington et al. .......... 719/316 |

OTHER PUBLICATIONS

Roman et al, "Dynamically Programmable and Reconfigurable Middleware Services", Oct. 27, 2004, IFIF 2004, pp. 372-396.*

* cited by examiner

*Primary Examiner*—Tuan Anh Vu
(74) *Attorney, Agent, or Firm*—Mark S. Walker; Dillon & Yudell LLP (57) ABSTRACT

A method, system and computer program product for creating a software product in an Integrated Development Environment (IDE). In one embodiment, remote object status data is received by a software development module which may be a source code editor or a program execution emulator. Responsive to the received data, the remote object status is rendered within a display medium of the software development module by decorating or otherwise distinguishing the remote OIDs in the IDE. In one embodiment in which the software development module is a source code editor, the method further includes detecting a remote object identifier in a source code file processed by the source code editor, and in response thereto, displaying the remote object status within the source code editor.

1 Claim, 8 Drawing Sheets

SYSTEM AND METHOD FOR REVEALING REMOTE OBJECT STATUS IN AN INTEGRATED DEVELOPMENT ENVIRONMENT

CROSS-REFERENCE TO RELATED APPLICATIONS

The present application is related to co-pending U.S. patent application Ser. No. 10/960,613, titled "SYSTEM AND METHOD FOR CONTRIBUTING REMOTE OBJECT CONTENT TO AN INTEGRATED DEVELOPMENT ENVIRONMENT TYPE-AHEAD," filed concurrently herewith, and incorporated herein by reference in its entirety.

BACKGROUND OF THE INVENTION

1. Technical Field

The present invention relates generally to integrated software development environments, and in particular to collecting, processing, and displaying remote object status data within a local software development environment. More particularly, the present invention relates to a system and method employing object monitoring and monitoring adapter features for enabling access to remote object status data utilized during software design and development.

2. Description of the Related Art

A prominent approach to managing the complexity of modern software development is the use of an Integrated Development Environment (IDE). IDEs typically support various on-line help mechanisms allowing, for example, a developer to reference on-line documentation describing various function definitions. Furthermore, for program development of a distributed application, it is important that information about remote objects be available to the developer. Remote objects are applications that do not reside on the computer executing the application code. These objects are able to be requested by the program using techniques such as a Remote Procedure Call (RPC). For example, the Java Remote Method Invocation (RMI) is a type of access to remote objects that a programmer, using the Java programming language, employs to access objects on different platforms over a distributed network.

Remote objects are often developed in a source language different than that of the accessing application. In addition, the remote objects may operate in an operating system environment different from the operating system environment of the accessing application. An Object Request Broker (ORB) architecture is used in such situations to enable local/client objects to access and use remote/server objects. An Interface Definition Language (IDL) defines the interfaces to the remote objects that the respective applications must use to access ORB services. An "object broker" then manages the communication between object-oriented client programs and remote object services, enabling a program or object written in one language to communicate with a remote object written in another language. There are a number of interface definition languages including the Common Object Request Broker Architecture (CORBA) IDL and the Web Services Descriptor Language (WSDL) IDL. The present invention is not limited to a particular IDL. An IDL is used by a client program through "stub" interfacing. The IDL is interpreted by an "IDL compiler" to generate program stubs in the programming language of the client program. When utilized in RMI, a stub program residing on the client side appears to the local calling program to be the remote object being called to provide a service.

Several problems relating to IDE software development have remained unaddressed. As explained above, IDE remote program interface mechanisms enable a local IDE project to incorporate remote programming resources (referred to herein generically as "remote objects") such as Web services into a given software project. These mechanisms are typically realized using an ORB architecture employing IDLs whereby program stubs are generated on the local platform and consequently may be used as a resource conduit to access remote resources during program runtime. However, many characteristics of the remote objects remain unknown to the local developer until the objects are accessed and retrieved using the foregoing ORB/IDL mechanisms. Systems and methods are known for monitoring and collecting data relating to performance, availability and other status indicia of object-oriented program resources. However, present distributed computing architectures do not include means by which such object status data may be utilized in order to increase remote object status transparency for an IDE software development environment.

From the foregoing, it can be appreciated that a need exists for an improved method and system for incorporating remote object status monitoring into the software design and development phases within an IDE. The present invention addresses this and other needs unresolved by the prior art.

SUMMARY OF THE INVENTION

A method, system and computer program product for rendering remote object status data in association with an Integrated Development Environment (IDE) are disclosed herein. In one embodiment, remote object status data is received by a software development module which may be a source code editor, object viewer, or a program execution emulator. Responsive to the received data, the remote object status is rendered within a display medium of the software development module by decorating or otherwise distinguishing the remote object identifiers in the IDE. In an alternate embodiment in which the software development module is a source code editor, the method further includes detecting a remote object identifier in a source code file processed by the source code editor, and in response, displaying the remote object status within the source code editor.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention is generally directed to a method, system and computer program product for developing software products in an Integrated Development Environment (IDE). More specifically, and as explained in further detail below, the present invention is directed to monitoring, processing and reporting remote object status data in support of source code editing, object viewing, and program execution emulation. The present invention integrates object monitoring capabilities into an IDE such that a software developer receives feedback on the status of a remote resource in direct association with a corresponding remote object identifier employed in source code editing, object viewing, or program debugging or profiling. As utilized in a source editor tool, for example, the remote object status reporting feature of the present invention enables a type-ahead or code-completion facility to visually distinguish between remote objects that are presently available from those likely to fail if called.

As utilized herein, a "remote object" refers to a program or program module, typically developed using an object-oriented source code language, that is accessed by a local/client IDE using a program interface broker such as Common Object Request Broker Architecture (CORBA). CORBA, Java Remote Method Invocation (RMI), and other IDE program interface broker interfaces have been developed to assist and standardize the process of finding and utilizing independently developed objects distributed across different network platforms. Using the techniques and conventions defined in the CORBA and RMI standards, designers of object oriented programs may easily and reliably access and utilize objects that are stored on local as well as remote servers with little or no prior knowledge of the existence of those objects, the details of those objects, or even the interface definitions of those objects. In this manner, frameworks such as CORBA and RMI enable executing programs to discover the existence of needed objects, determine the necessary data required to invoke and initiate the needed objects, and to invoke instances of those objects at run-time.

The CORBA and RMI architectures employ Interface Definition Language (IDL) facilities to describe remote object program resources and support distributed object sharing within such frameworks. IDL has been adopted as a standard by the International Organization for Standardization (ISO), and it is a simple language with similar syntax to C++ and Java. IDLs can include CORBA, IDL, Web Services Definition (WSDL), Java RMI descriptors as well as registry information in Universal Description Discovery and Integration (UDDI) or Java Naming Directory (JNDI) form or repositories such as XMLRR or Lotus Notes Data Objects. All of these IDLs will be referred to in the following discussion as an "IDL." To achieve discovery and invocation of remote objects, the CORBA and RMI frameworks provide for an Object Request Broker (ORB) through which client objects may discover the existence of potential server objects including the operations they offer, and through which client objects may request the instantiation of object instances and control of those objects.

Figure 1:
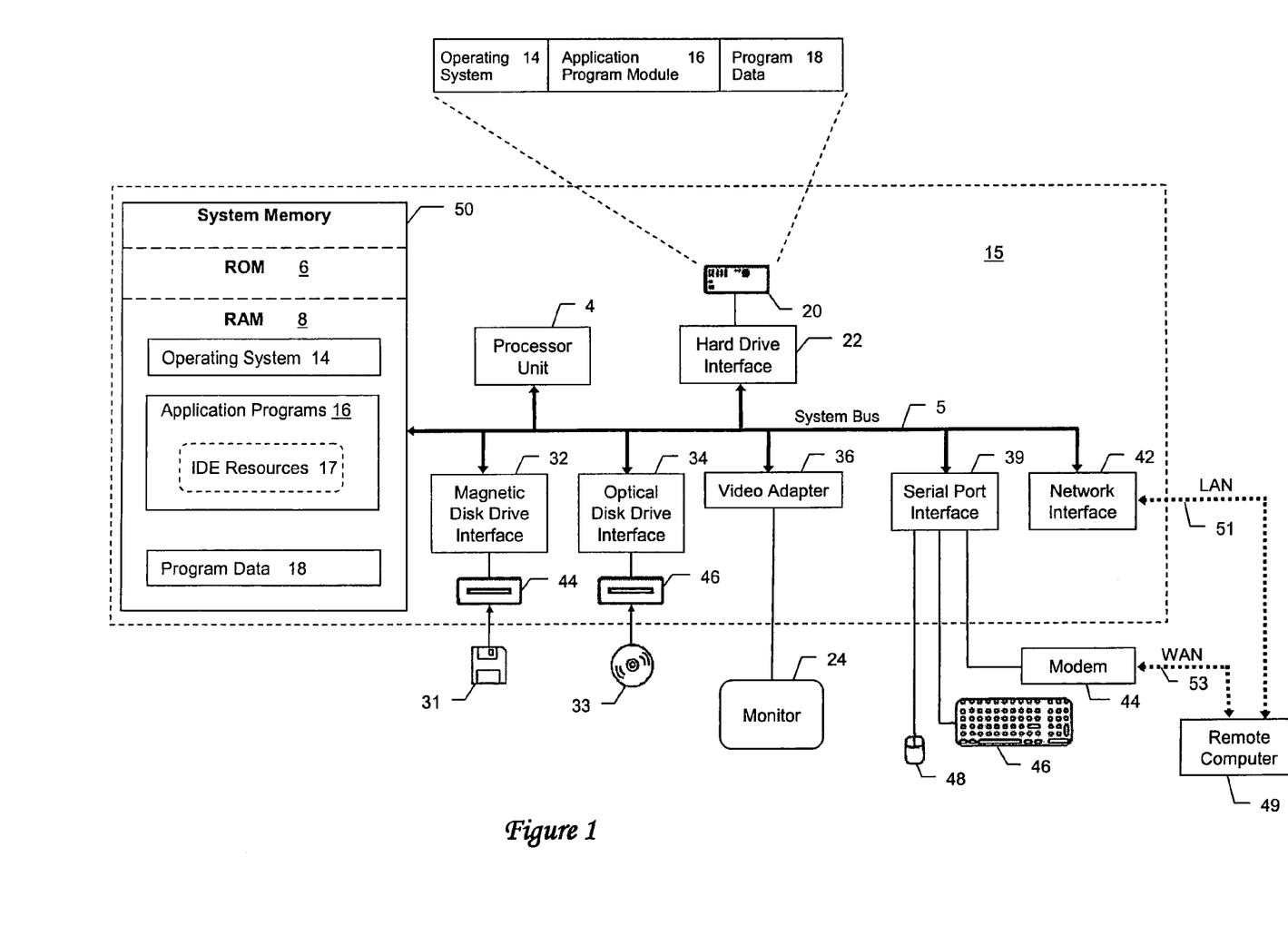
FIG. 1 illustrates a data processing system adapted for processing remote object status information during local software design and development in accordance with the present invention.

With reference now to the figures, wherein like reference numerals refer to like and corresponding parts throughout, and in particular with reference to FIG. 1, there is depicted a data processing system adapted for implementing the present invention. For discussion purposes, the data processing system is described as a personal computer, such as a desktop or portable computer. However, as used herein, the terms "data processing system," "computer," and the like, are intended to mean essentially any type of computing device or machine that is capable of running a software product.

While the invention will be described in the general context of programs running on an operating system in conjunction with a personal computer, those skilled in the art will recognize that the invention may also be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including multiprocessor systems, microprocessor-based or programmable consumer electronics, minicomputers, mainframe computers, and the like.

The exemplary data processing system illustrated in FIG. 1 generally comprises a personal computer 15, having a processing unit 4, a system memory 50, and a system bus 5 that couples system memory 50 to processing unit 4. The system memory 50 includes read only memory (ROM) 6 and random access memory (RAM) 8. Personal computer 15 further includes a hard disk drive 20, a magnetic disk drive 44, e.g., to read from or write to a removable disk 31, and an optical disk drive 46, e.g., for reading a CD-ROM disk 33 or to read from or write to other optical media. Hard disk drive 20, magnetic disk drive 44, and optical disk drive 46 are connected to system bus 5 by a hard disk drive interface 22, a magnetic disk drive interface 32, an optical drive interface 34, respectively. The drives and their associated computer-readable media provide non-volatile storage for personal computer 15.

A number of program modules may be stored in the drives and system memory 50, including an operating system 14, application program modules 16, and program data 18. In accordance with the depicted embodiment, a set of one or more IDE program resources 17 are further included as applications within system memory 50. As explained in further detail below, IDE program resources 17 include source code design and development utilities and supporting programs and instructions enabling a programmer to develop source code in a distributed environment.

A user may enter commands and information into personal computer 15 through a keyboard 46 and pointing device, such as a mouse 48. Other input devices (not shown) may include a microphone, joystick, game pad, satellite dish, scanner, or the like. These and other input devices are often connected to processing unit 4 through a serial port interface 39 that is coupled to the system bus, but may be connected by other interfaces, such as a universal serial bus. A monitor 24 or other type of display device is also connected to system bus 5 via an interface, such as a video adapter 36.

Personal computer 15 may operate in a networked environment using logical connections to one or more remote computers, such as a remote computer 49. The remote computer 49 may be a server, a router, a peer device or other common network node, and typically includes many or all of the elements described relative to personal computer 15. The logical network connections depicted in FIG. 1 include a local area network (LAN) 51 and a wide area network (WAN) 53. Such networking environments are commonplace in offices, enterprise-wide computer networks, Intranets and the Internet.

When used in a LAN networking environment, personal computer 15 is connected to LAN 51 through a network interface 42. When used in a WAN networking environment, personal computer 15 typically includes a modem 44 or other means for establishing communications over WAN 53, such as the Internet. The modem 44, which may be internal or external, is connected to system bus 5 via serial port interface 39. In a networked environment, program modules depicted relative to personal computer 15, or portions thereof, may be stored in one or more remote (i.e., network distributed) memory storage devices. It will be appreciated that the network connections shown are exemplary and other means of establishing a communications link between the computers may be used.

In accordance with the depicted embodiment, application programs 16 further includes IDE program resources 17 which as explained in further detail with reference to FIGS. 2-6, include program modules and instructions supporting software design and development such as source code entry/editing and program execution emulation facilities. Supporting such software design and development functionality are features providing run-time access to remote object status information and for processing such status information in a manner facilitating efficient source code editing and program debugging and analysis.

Figure 2:
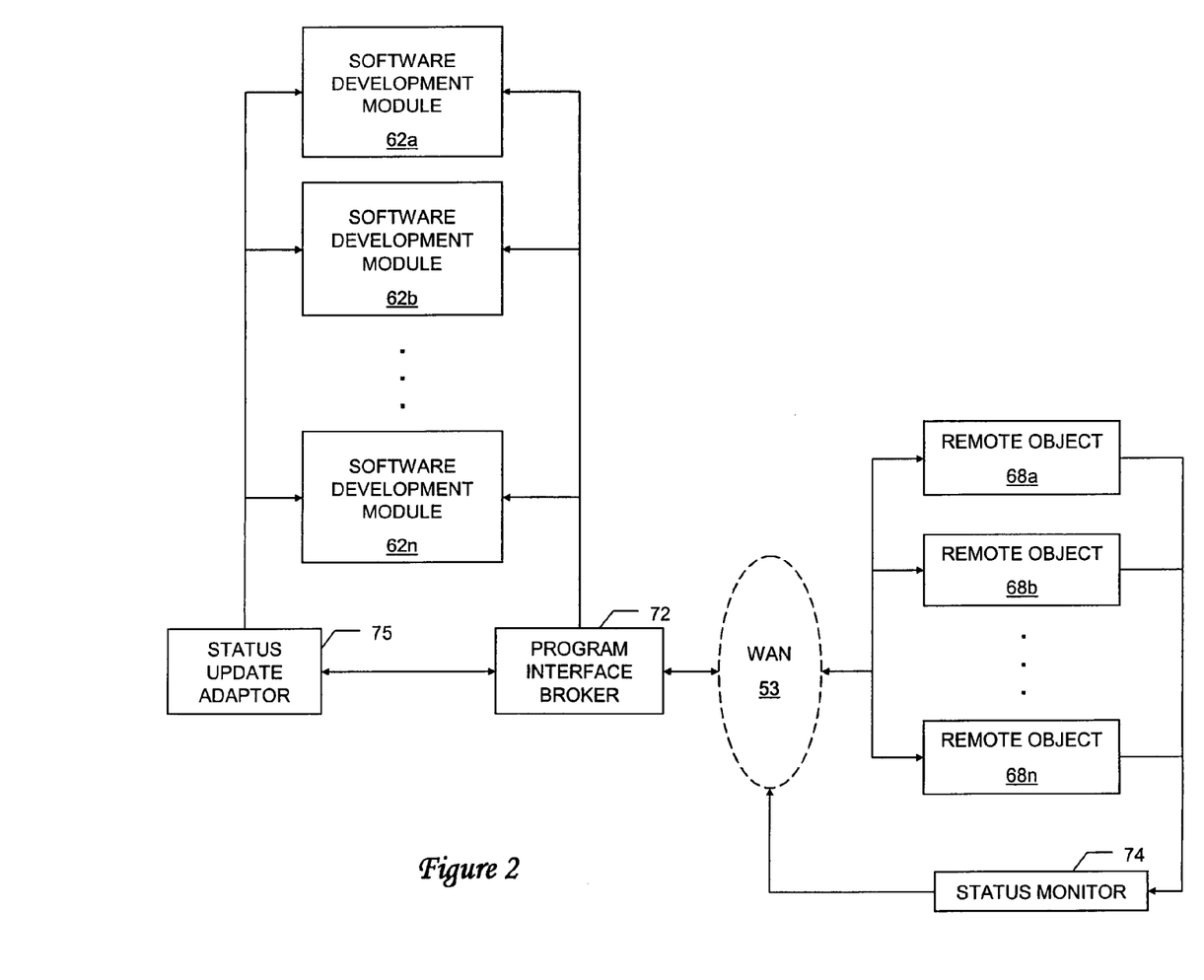
FIG. 2 is a high-level block diagram depicting a system for collecting, reporting and utilizing remote object status information in support of local software design and development in accordance with the present invention.

With reference to FIG. 2, there is illustrated a high-level block diagram depicting a system for collecting, reporting and utilizing remote object status information in support of software design and development in accordance with the present invention. As shown in FIG. 2, the system generally includes several software development applications 62a-62n which communicate through a program interface broker 72 to any of multiple remote objects 68a-68n via WAN 53.

Software development applications 62a-62n are client software applications each including sequences of instructions that are executed by one or more processors. More specifically, each of software development applications 62a-62n are IDE applications utilized for designing and/or developing software products such as object-oriented computer programs using distributed resources. Exemplary software development modules 62 may include source code editors, object viewers, program execution emulators (e.g. debuggers and profilers), and other software development programs included in an IDE. Furthermore, each of applications 62a-62n includes native program modules, instructions, and data that include references in the form of remote object identifiers to one or more of remote objects 68a-68n. Remote objects 68a-68n, as defined herein, are accessible by a local/client IDE containing software development applications 62a-62n using a program interface broker 72 such as may be implemented in CORBA. In accordance with known IDE program interface architectures such as CORBA, program interface broker 72 includes electronic and/or software program modules enabling software development applications 62 to discover, access, and utilize remote objects 68a-68n. Specifically, program interface broker 72 may present a multiple layered software architecture employing ORB and IDL functionality for accessing and locally instantiating proxies for remote objects 68a-68n on the respective local platform.

The system depicted in FIG. 2 further includes remote object monitoring functionality. Specifically, a status monitor block 74 represents electronic and/or software program means for monitoring the status of one or more of remote objects 68a-68n. Such means for monitoring program objects and resources are known in the art and may include, for example reporting registries in which the operational availability of the object in question is reported to and stored in data storage means (not depicted) incorporated in status monitor 74. Object status data monitored and recorded by status monitor block 74 may include object lifecycle data (e.g. object not responding) as well as Quality of Service (QoS) metrics such as average throughput and average response time associated with a given object.

The depicted system further comprises a status update adapter 75 designed and deployed with respect to software development modules 62a-62n and status monitor 74 in accordance with the present invention. On the network side, program interface broker 72 communicatively couples status update adapter 75 to status monitor module 74 via a local or wide area network such as WAN 53. Specifically, program interface broker 72 utilizes known program interface broker techniques such as CORBA program interfacing in which IDLs are employed to broker communications between status update adapter 75 and status monitor 74 or an equivalent functional substitute. Status update adapter 75 is also communicatively coupled on the local IDE side to software development applications 62a-62n. Status update adapter 75 provides a remote object status update forum from and to which applications 62 communicate in support of a given software development project. To this end, status update adapter 75 includes program and/or electronic processing modules, instructions, and data for anticipating remote object identifiers (OIDs) that may be processed by software modules 62 and for retrieving and recording object status data in association with the identifiers. In support of its remote OID anticipation function, status update adapter 75 preferably utilizes a prediction algorithm for predicting possible remote OIDs in accordance with program interface definitions derived from one or more IDLs. In a preferred embodiment, status update adapter 75 further employs processing and instruction means for generating status inquiry requests to be processed by status monitor 74 and for processing and recording the resultant inquiry responses from status monitor 74.

Figure 3:
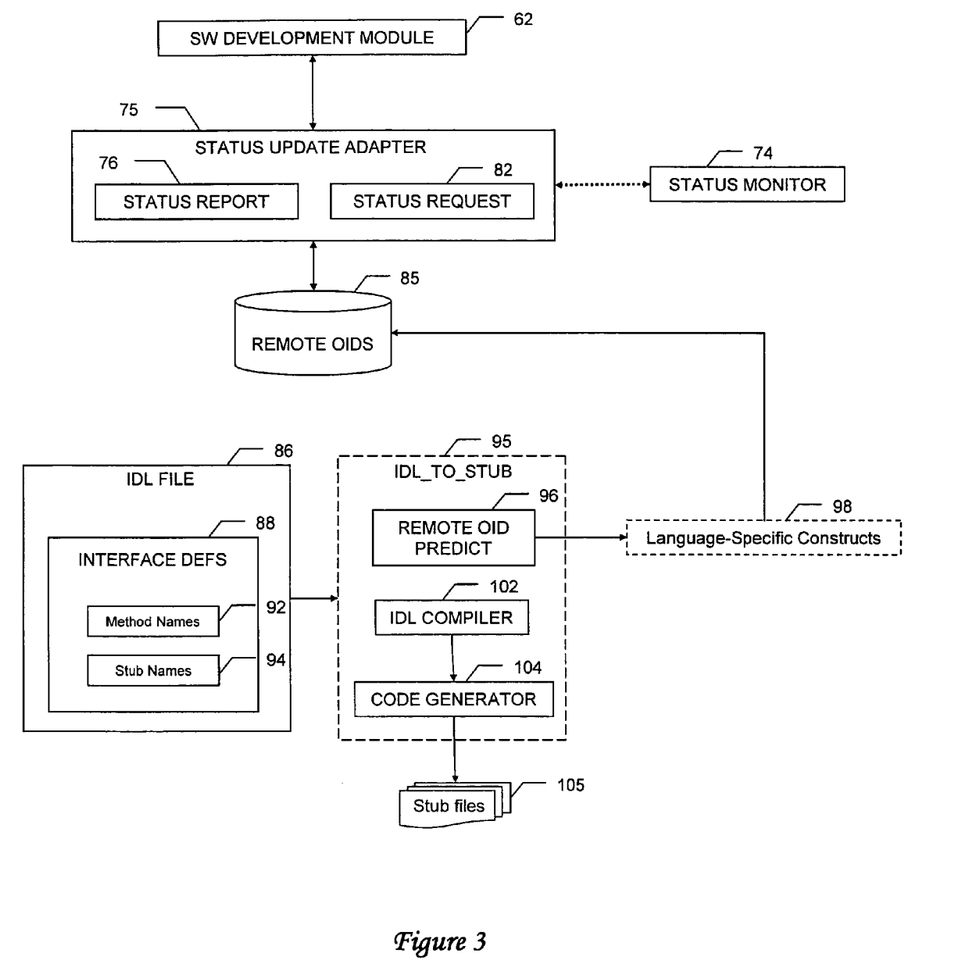
FIG. 3 is a high-level block diagram illustrating a system employing facilities for monitoring, collecting, and processing remote object status information in accordance with the present invention.

FIG. 3 is a high-level block diagram illustrating a system employing a status update adapter for retrieving, recording, and processing remote object status information in accordance with the present invention. The depicted system generally comprises status update adapter 75 coupled (such as shown in FIG. 2) to status monitor 74 and a software development module 62. Status update adapter 75 includes a status request module 82 that includes program instruction means and data for generating status request inquiries relating to availability or other QoS metrics relating to one or more of the remote objects tracked by status monitor 74. More particularly, status request module 82 comprises program means for requesting from status monitor 74 the status of one or more remote objects specified by corresponding object identifiers (i.e. syntax specific names or identifiers utilized in the respective programming language to designate a particular resource or object) that may be processed by software development module 62.

The status inquiry request feature supports the generation of an object status data repository which may be in the form of a local database or otherwise. Specifically, status update adapter 75 further employs program processing means for recording and correlating within a remote OID database 85, remote OIDs with corresponding status data included in status inquiry feedback from status monitor 74. Many different correlation techniques are possible for correlating the OIDs with the respective status data using known data record association techniques.

The status inquiry requests delivered from status update adapter 75 to status monitor 74 include as arguments one or more remote OIDs. Given that remote OIDs are typically not readily available in a local IDE processing environment without the invocation of object request brokering facilities such as those provided by CORBA, the present invention provides a remote OID anticipation facility. Specifically, the depicted system includes a remote OID anticipation contribution mechanism that advantageously utilizes IDE remote program interface tools to derive and contribute prospective remote OIDs to remote OID database 85. Such remote program interface tools are generally characterized as belonging to IDE interface definition architectures such as those employed by Interface Definition Languages (IDLs). IDLs are well-known in the IDE art field as definition or description languages (not programming languages) that are utilized to describe an object's interface; that is, the characteristics and behavior of a specified object, including the operations that can be performed on the object. IDLs are usefully employed in IDEs to facilitate the common sharing of interface definitions in which both the client and server applications require information about the available interfaces, including the objects and object-specific operations.

For illustrative purposes intended to characterize IDLs as conventionally deployed in an IDE, FIG. 3 depicts how IDL source code files are processed into client applications. Specifically, an IDL source code file 86, which may be included in a client-specified IDL registry, is prepared containing interface definitions 88. IDL source code file 86 is processed by an IDL_TO_STUB generator module 95 that includes an IDL compiler 102 for compiling source file 86 in accordance with known IDL compilation methods and the results are received and processed by a code generator 104. The code generator 104 includes program modules and instructions for generating special program interface files specified in the language of the client application module 62. Code generator 104 and IDL compiler 102 are typically combined within a single application, such as IDL_TO_STUB generator 95, to produce the language-specific code in the form of one or more so-called program stub files 105. Together, IDL compiler 102 and code generator 104 translate a specified object's interface into a specific programming language according to ORB mapping specified by the IDL interface definitions 88.

As explained above, the generated stubs are truncated extensions of the programs that are compiled into them and appear to the local calling program to be the respective program being called for a service. Stub files 105 are compiled by a language-specific compiler (not depicted) and linked to the client application making the call. In this manner the IDL-generated stubs provide comprehensive remote program resources that may be utilized during compilation and/or program runtime and may also be accessed by status update adapter 75 for obtaining candidate remote OIDs to be included in status. However, the foregoing described stub generation processing requires significant processing resources and time. As further illustrated in FIGS. 3-8, the present invention provides remote object status reporting features that do not unduly interrupt or burden software development processes in an IDE.

With continued reference to FIG. 3, the depicted embodiment employs a remote OID prediction module 96 such as may be incorporated or utilized by status update adapter 75 in obtaining or deriving keywords from remote object artifacts contained within IDL source file 86. Remote OID prediction module 96 preferably includes program modules and instructions for predicting syntax-specific identifiers corresponding to remote objects from the remote object language artifacts. In a preferred embodiment, the remote object artifacts from which the remote OIDs are predictively or otherwise derived are specified within the interface definitions 88 of IDL source file 86. The interface definitions may include object methods names 92 and stub names 94 as well as other language and/or object specific identifiers or indicia. The predicted remote OIDs (in some cases the source code artifacts themselves) are then included as language-specific constructs 98 that are incorporated into the remote OID database 85 that may then be accessed by status update adapter 75 in support of software development module 62.

Figure 6:
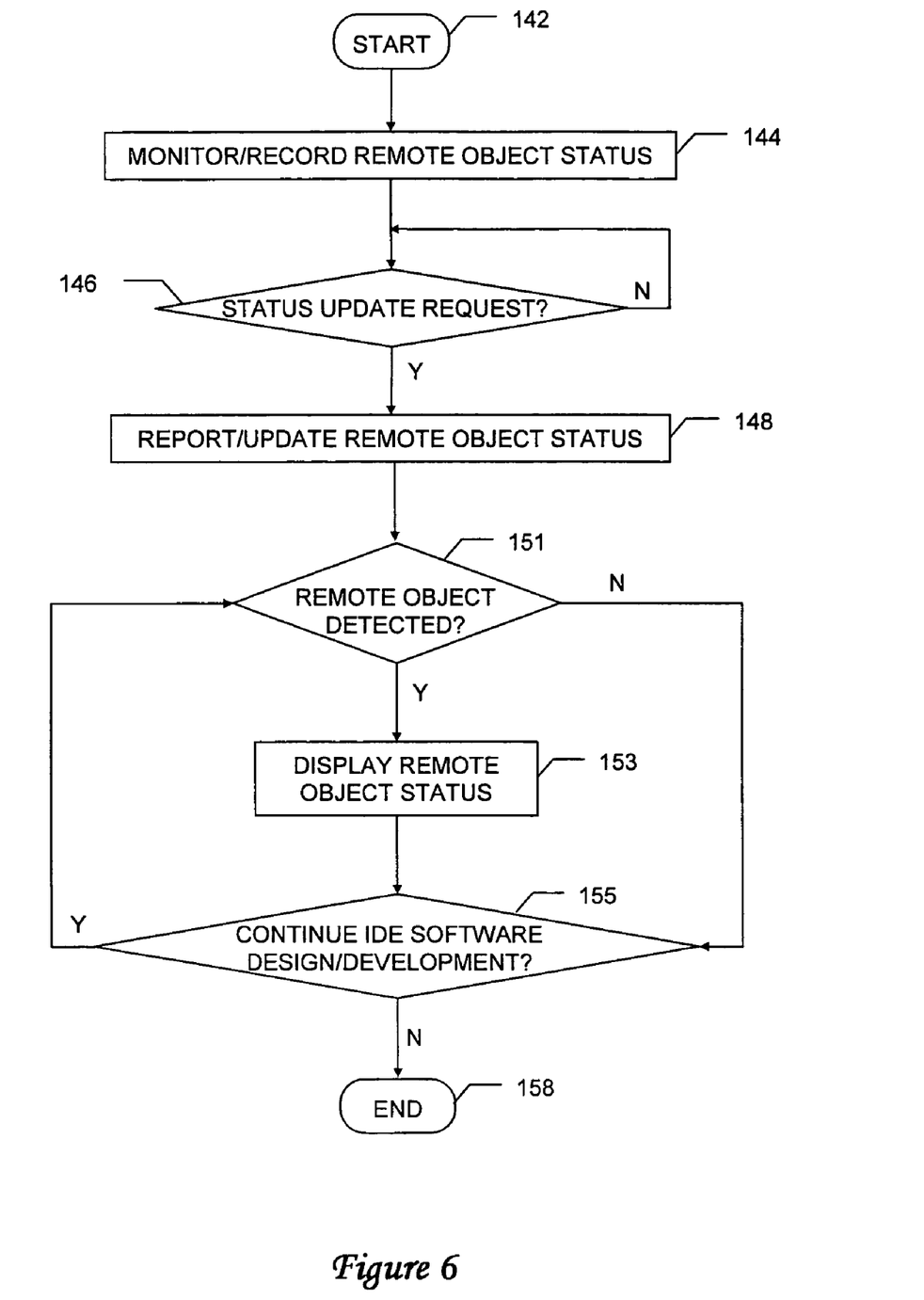
FIG. 6 is a high-level flow diagram depicting steps performed during remote object status monitoring, reporting and processing in accordance with a preferred embodiment of the present invention.

FIG. 6 is a high-level flow diagram depicting steps performed such as by the system components shown in FIGS. 2 and 3 during remote object status monitoring, reporting and processing in accordance with a preferred embodiment of the present invention. The process begins as shown at step 142 and proceeds to step 144 with the remote object status monitored and recorded such as by status monitor 74 and status update adapter 75. Next as illustrated at steps 146 and 148, the remote object status for a given remote OID entry is updated within remote OID database response to a status update request delivered from status update adapter 75 to status monitor 74.

The remote OID processing of the present invention further includes displaying rendering techniques that enable a software developer to quickly identify and ascertain the status of a remote object. Specifically, and as depicted at steps 151 and 153, responsive to a remote OID detected in a software development environment, the status of the remote object is displayed. Such status display preferably conveys information pertaining to one or more Quality of Service (QoS) metrics such as present or statistical availability of the named remote object resource. The IDE software design/development process continues (step 155) in this manner until the process ends as shown at step 158.

Figure 4:
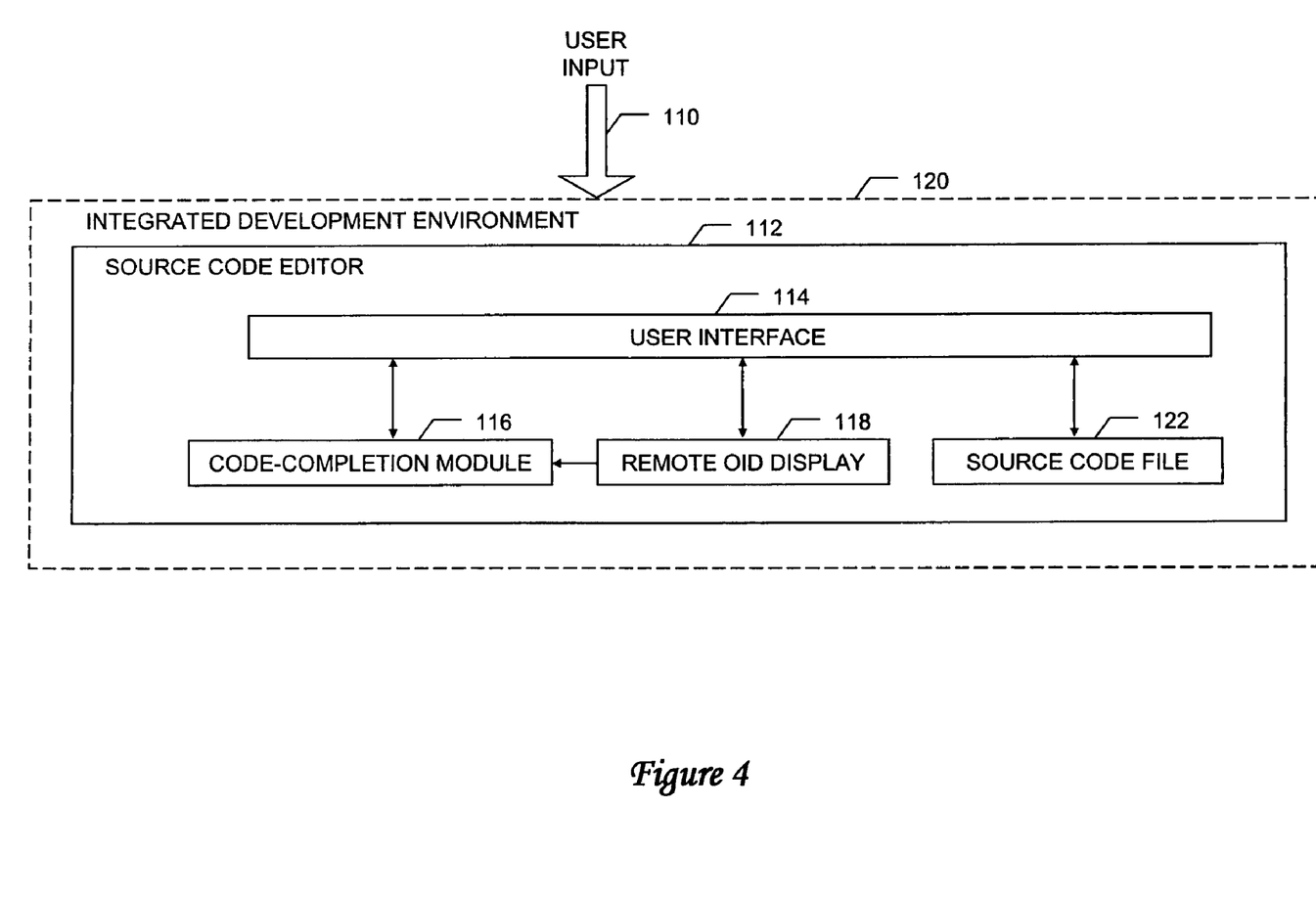
FIG. 4 is a high-level block diagram depicting an IDE source code editor that interfaces with and incorporates system components shown in FIGS. 2 and 3 in accordance with the present invention.

Referring to FIG. 4, there is depicted a high-level block diagram of a software development module in the form of an IDE source code editor that interfaces with and/or incorporates system components shown in FIGS. 2 and 3 in accordance with the present invention. Specifically, a source code editor 112 is deployed from an IDE 120 that receives local code developer input in the form of user input 110. Consistent with IDE source code editing convention, source code editor 112 generally provides text and user interface (UI) object editing tools utilized by a code developer to enter and modify programs. Source code editor 112 responds to user input 110 from input devices 46 and 48 (FIG. 1) to a user interface 114 and generates and organizes the resultant input source code data as a source code file 122 maintained in memory such as main memory 50 (FIG. 1). Source code file 122 generally comprises a text description of a program module, as written in a given programming language by a software developer.

Typically, and as is known in the art, source code file 122 comprises a series of statements defining the data structures and actions the computer is to implement using the data structures. These statements are composed of various programming language tokens, which are combined to form declarations and definitions that describe the entities that make up the computer program. Identifiers are utilized to identify particular entities in the program, such as function names, variable names, class names, macro names and template names. Those of ordinary skill in the art will recognize that various entities and identifier mechanisms are used in various object-oriented programming languages. Although not depicted in FIG. 4, it will be appreciated by those skilled in the art that the code development tools provided within IDE 120 may further include parser, compiler, and linker functionality for rendering an executable program module (not depicted) from source code file 122.

In general, user input 110 takes the form of statements in the syntax of the programming language supported by IDE 120, but may also include input from various menus, dialogs, wizards, and other UI controls provided by user interface 114. As related to a preferred embodiment of the present invention, a given program module as embodied by source code file 122 is entered by the developer as part of an object-oriented software development project. Such projects may be Java, C++, or similar object-oriented architecture projects in which each project may include one or more class modules which each define one or more objects.

The system and method of the present invention closely relate to the text entry and rendering involved during development of source code file 122. Specifically, and as shown in the depicted embodiment, the user interface 114 is communicatively associated with a type-ahead facility in the form of a code-completion module 116. Code-completion module 116 includes keyword lookup and retrieval functions and deploys electronic and/or program modules and processing means enabling it to be invoked and utilized in support of developer text entry efforts. Code-completion module 116 is preferably invoked by user interface 114 or other source editor prompt input and responsive thereto performs a type-ahead or code-completion search in which, for example, a latest-entered text string entered into source code file 122 is compared with keywords obtained or derived from project-linked artifacts and included in a keyword compare pool. To this end, code-completion module 116 typically performs a string-matching function and returns a dialog box, or the like, displaying a list of one or more possible keywords, in the form of qualified names for object types, classes, methods, etc. from which the developer may select as the correct entry.

While the result of the code-completion function is implemented at the user interface level by displaying a UI dialog as described above, the system and method of the present invention are particularly related to rendering remote object identifiers in a manner helpful to the code developer. Although not depicted in FIG. 4, code-completion module 116 is communicatively linked to a local artifact source representing the keyword contributions from local (i.e. accessed independently of IDE remote program interfacing) resources. Typically, such locally available keyword sources include identifiers from object libraries, runtime environment object classes, etc., which are obtained or derived independently of IDE remote program interfacing (e.g. CORBA interfacing), and from which the local artifact keywords are contributed as part of an IDE application development project. In accordance with the present invention, the keyword contribution mechanism is augmented by providing a remote artifact keyword contribution source (not depicted) that includes keyword resources that may not be locally available and are instead obtained or derived in association with IDE remote program interfacing such as that provided by CORBA. Keywords provided by the remote artifact keyword source are preferably determined and contributed by a remote object contribution system and method described in related U.S. application Ser. No. 10/960,613, the entire content of which is incorporated herein by reference.

The remote object keywords included in code completion module 116 coincide with remote OIDs that are detected and decorated by a remote OID display module 118. Remote OID display module 118 includes processing and/or program means for displaying the remote object status within a display medium of source code editor 112. Such display may include the use of so-called decorators in which the text corresponding to remote OIDs is color coded, underlined, or otherwise highlighted to provide the developer with a ready visual indication of the identity of the text string as associated with a remote object. Remote OID display module 118 detects remote OIDs entered into source code editor 112 and responsive thereto displays the remote object status such as by applying a decorator or invoking a mouseover display with respect to the detected remote OIDs. In support of its detection function, remote OID display module 118 includes instructions for matching source code file entries with entries in the remote OID database 85.

Figure 7:
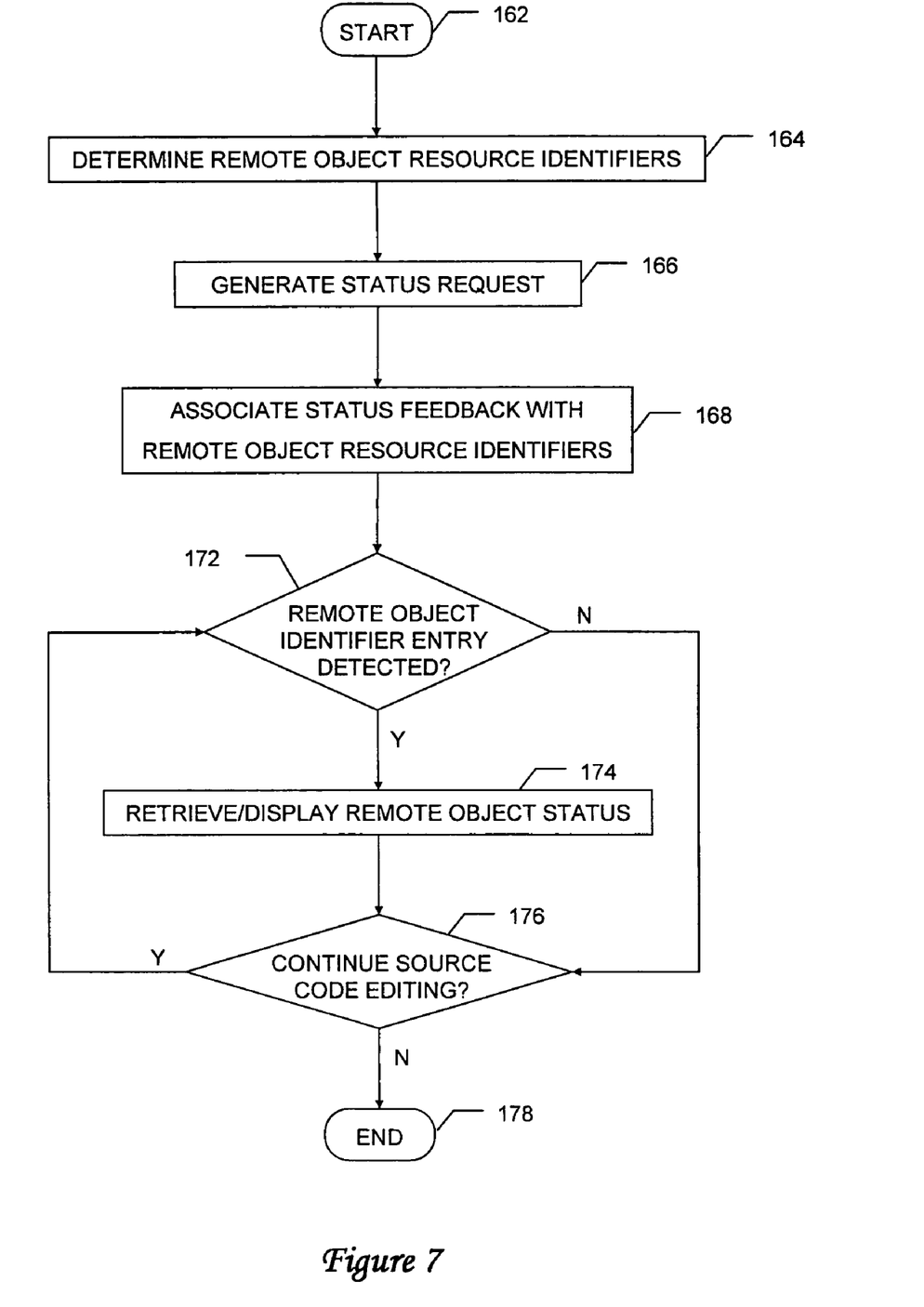
FIG. 7 is a high-level flow diagram illustrating steps performed as part of remote object status processing performed during software design in accordance with the present invention.

FIG. 7 is a high-level flow diagram illustrating steps performed as part of remote object status processing performed during source code editor software design in accordance with the present invention. The process begins as shown at step 162 and proceeds to step 164 with a determination of remote OIDs such as may be entered via user input possibly in combination with code-completion module 116. Next, a status request is generated by remote OID display module 118 or other program means within source code editor 112 and delivered to status update adapter 75. The status feedback data obtained from status update adapter 75 relating to one or more of the determined/identified remote OIDs is associated with the identifiers themselves and is utilized by remote OID display module 118 to determine whether or which decorator or display indicia to apply to the remote OIDs.

Proceeding to steps 172 and 174, responsive to detection of one or more remote OIDs entered into source code file 122, the status information (associated as per step 168) is displayed as a text decorator or otherwise in source code editor 112. The source code entry/editing continues in this manner (step 176) until the process ends as shown at step 178.

Figure 5:
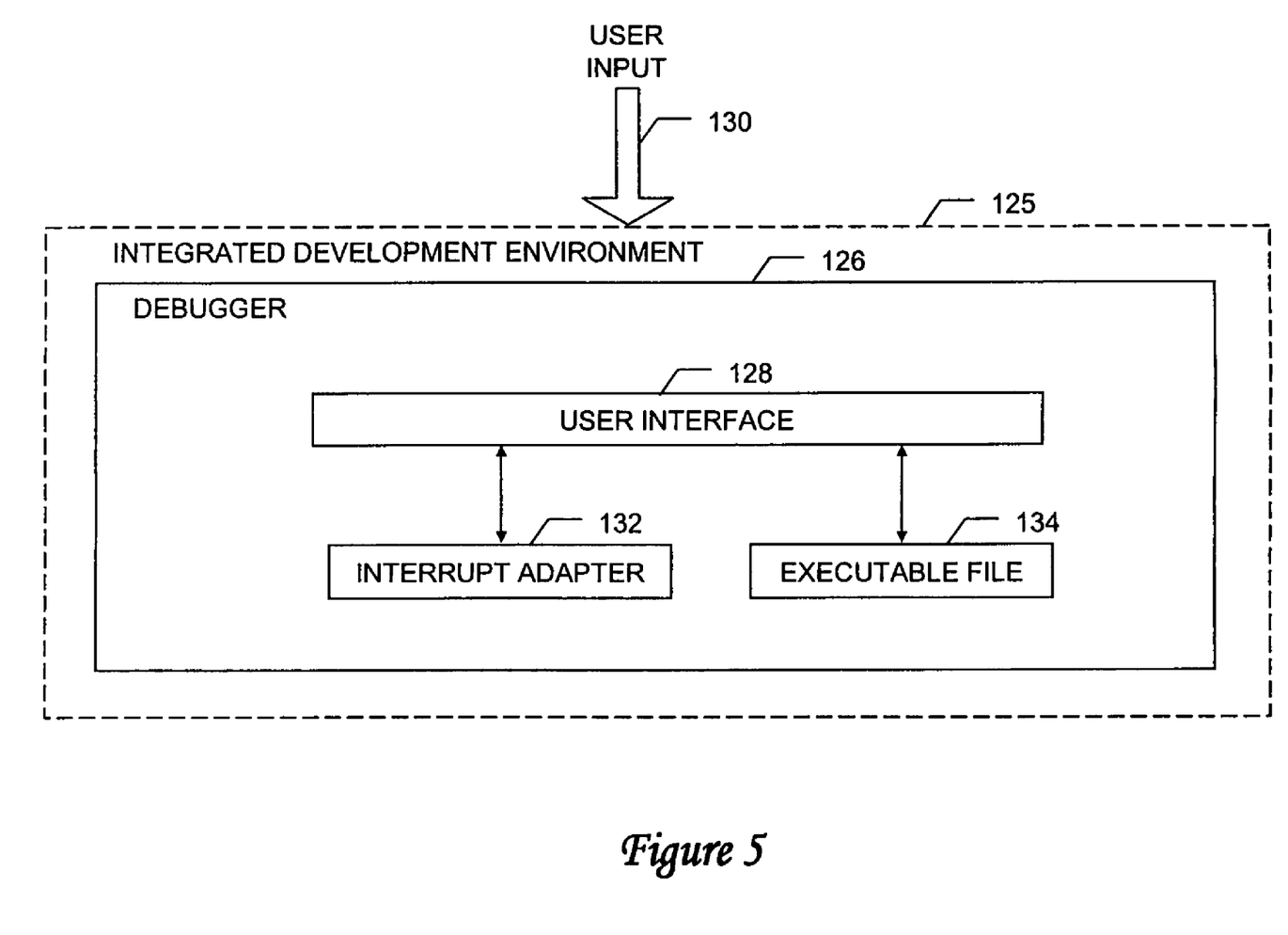
FIG. 5 is a high-level block diagram illustrating an IDE debugger that interfaces with and incorporates system components shown in FIGS. 2 and 3 in accordance with an alternate embodiment of the present invention.

While FIGS. 4 and 7 depict an embodiment for rendering remote object data in a source code development environment, the present invention is further applicable to supporting other phases of software program development such as program execution emulation undertaken during program debugging or profiling. FIG. 5 is a high-level block diagram illustrating an IDE debugger that interfaces with and incorporates system components shown in FIGS. 2 and 3 in accordance with an alternate embodiment of the present invention. As shown in the depicted embodiment, an IDE 125 receives user input 130 for use in a debugger module 126. Debugger module 126 generally comprises a user interface 128 communicatively coupled to an executable file 134 and an interrupt adapter 132.

Figure 8:
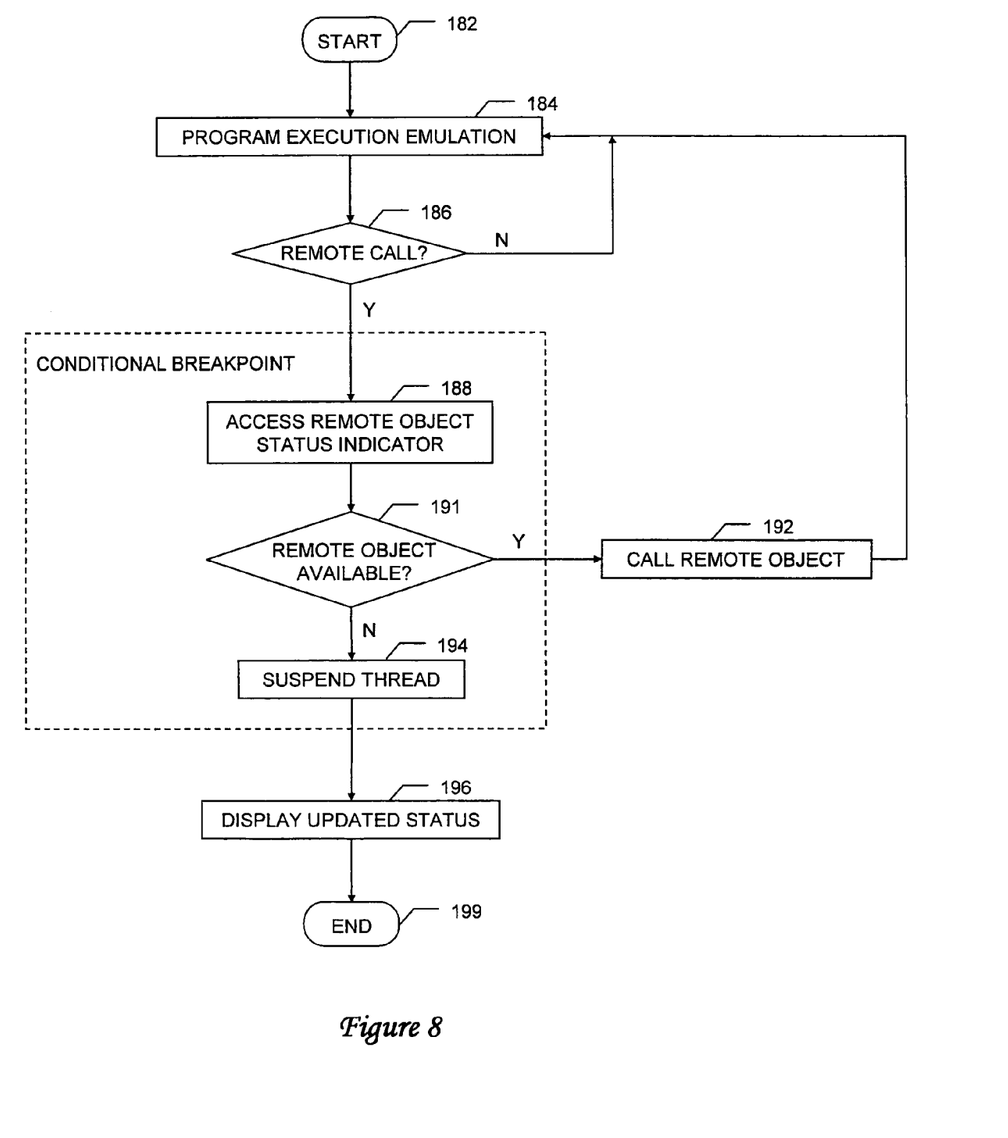
FIG. 8 is a high-level flow diagram illustrating steps performed as part of remote object status processing performed during program execution emulation in accordance with the present invention.

FIG. 8 is a high-level flow diagram illustrating steps performed as part of remote object status processing performed during program execution emulation in accordance with the present invention. The process begins as shown at step 182 and proceeds to step 184 with program execution emulation processing such as running a compiled (i.e. executable) file 134 within debugger 126. Responsive to a remote call (step 186) a conditional breakpoint is entered by processing/program means of a status update adapter such as may be employed by debugger 126. As part of the conditional breakpoint, a remote OID status indicator such as may be recorded in remote OID database 85 is accessed (step 188) and a further determination made of whether the remote object corresponding to the OID is available (step 191). If the status information indicates the object is available the breakpoint is exited the remote object called to continue the debugging emulation process (steps 191, 192). If, however, the status data indicates the object is not available or possibly in an unreliable status condition, the debug thread is suspended and the updated object status is displayed to the user (steps 191, 194, 196) before the process ends at step 199.

The disclosed methods may be readily implemented in software using object or object-oriented software development environments that provide portable source code that can be used on a variety of computer or workstation hardware platforms. In this instance, the methods and systems of the invention can be implemented as a routine embedded on a personal computer such as a Java or CGI script, as a resource residing on a server or graphics workstation, as a routine embedded in a dedicated source code editor management system, or the like.

Alternatively, the disclosed computer controlled code-completion system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The computer controlled code-completion systems and methods described above, however, can be readily implemented in hardware and/or software using any known or later-developed systems or structures, devices and/or software by those skilled in the applicable art without undue experimentation from the functional description provided herein together with a general knowledge of the computer arts.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. A method for creating software products using an integrated development environment including a debugger and further including a source code editor having a type-ahead facility, said method comprising:
　facilitating user entry of source code into the source code editor, said facilitating including:
　　accessing a remote object interface repository that includes interface definitions;
　　determining one or more keywords from the interface definitions, wherein said determining includes predicting the one or more keywords in accordance with the interface definitions and a target programming language naming convention; and
　　inserting one or more of the determined keywords into the type-ahead facility of the source code editor, such that user keystrokes are reduced;
　collecting a set of remote object identifiers representing remote objects available to the integrated development environment;
　periodically determining a status of said remote objects using said set of remote object identifiers; and
　providing remote object status information to said integrated development environment by displaying the remote object identifiers within a display of the source code editor of the integrated development environment utilizing color coding to indicate remote object status information, wherein:
　　said remote object status information includes at least one quality of service metric of a remote object, including statistical availability metrics or current operational availability of the remote object; and
　　said remote object status information indicates that the remote object is unavailable in response to the debugger of the integrated development environment determining that the remote object is unavailable while emulating execution of a program that calls the remote object.

* * * * *